United States Patent Office 2,834,623
Patented May 13, 1958

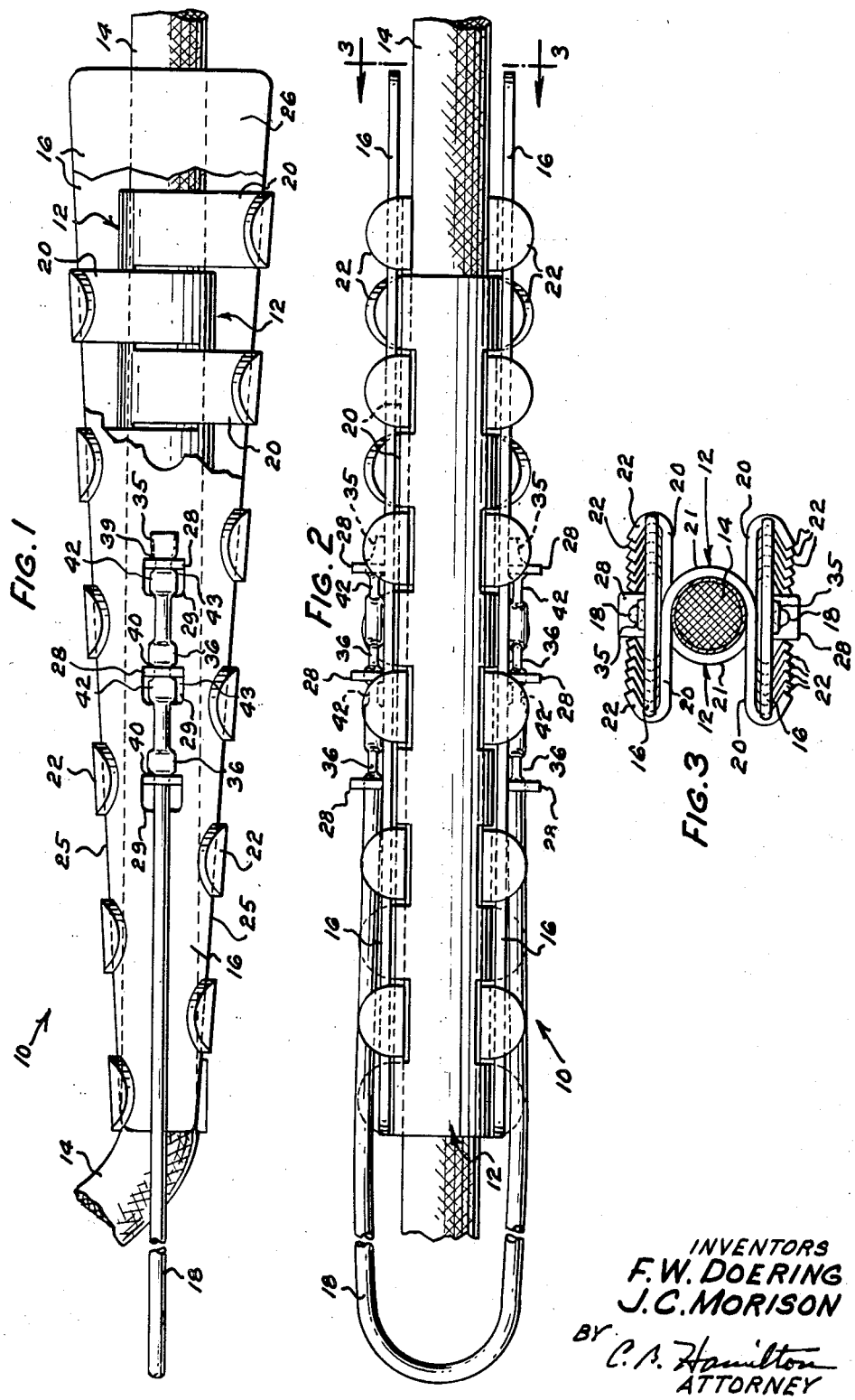

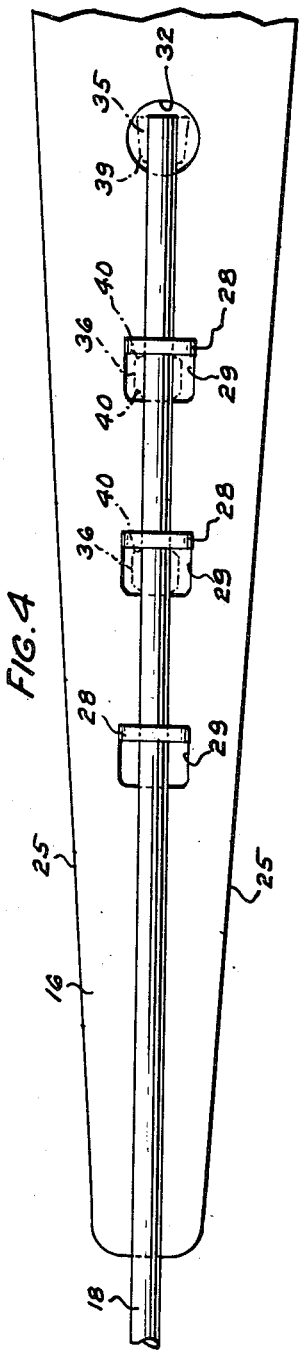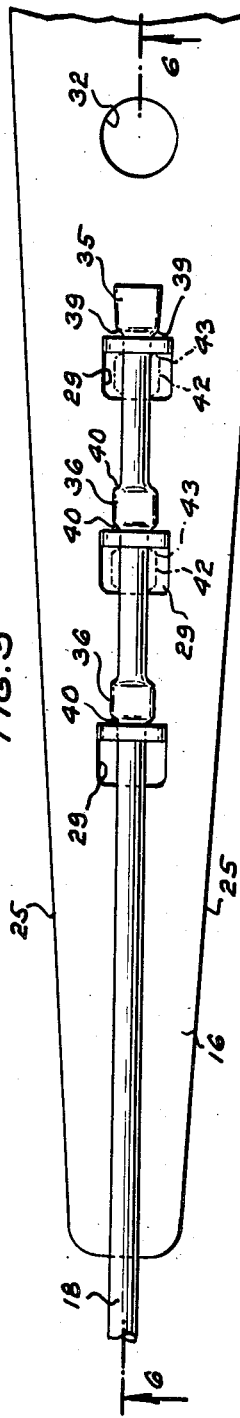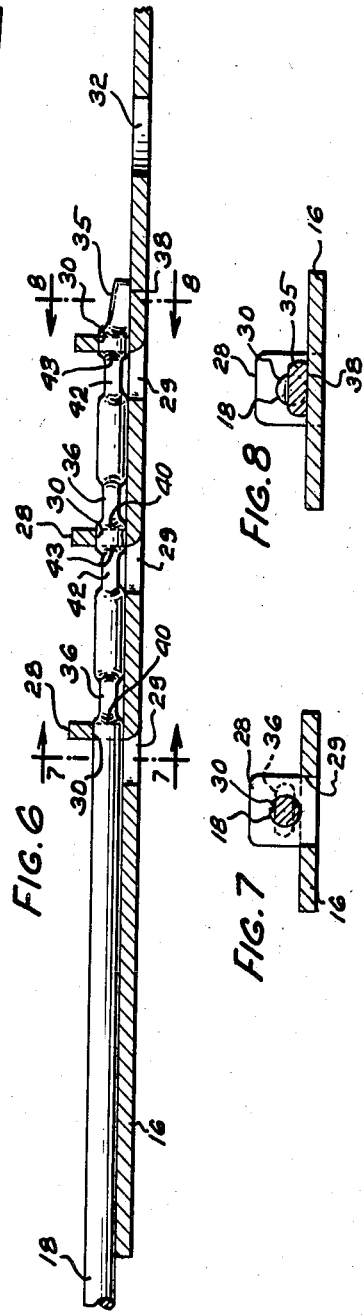

2,834,623

METHOD OF INTERLOCKING PARTS BY DEFORMATION AND AN ARTICLE OF MANUFACTURE FORMED THEREBY

Fred W. Doering, Cicero, and James C. Morison, La Grange, Ill., assignors to Western Electric Company, Incorporated, New York, N. Y., a corporation of New York Application December 8, 1953, Serial No. 396,802

10 Claims. (Cl. 287—82)

This invention relates to cable supporting devices and a method of making a component thereof and more particularly to a wedge plate and tail wire component of a cable supporting device and the method of attaching the tail wire to the wedge plates of said component.

In telephone equipment a branch cable leading from a main cable to a building is usually supported on the telephone post and on the building by cable supporting devices or multiple drop wire clamps comprising a pair of clamping shells encircling portions of the cable from opposite sides and having interfitting fingers with hook-shaped ends thereof between which ends wedge plates are positioned and stressed for movement by the weight of the cable to draw the clamping shells into tight engagement with the cable. The wedge plates are secured to the ends of a tail wire which is hooked on suitable supporting members for supporting the clamp and the cable therein. It is important that the tail wire be securely attached to the wedge plates with a minimum loss of tensile strength to form a sturdy and durable component of the cable supporting device.

An object of the present invention is to provide an improved wedge plate and a tail wire component of a cable supporting device.

Another object of the invention is to provide an improved method of securely attaching the tail wire to wedge plates of a component of a cable supporting device.

A still further object of the invention is to provide an improved method of mechanically attaching a wire to a plate with a minimum loss of tensile strength.

One type of wedge plate and tail wire assembly and a method of making same illustrating certain features of the invention may include forming a pair of apertured plates with a plurality of perforated tabs shear formed on the plates in spaced and aligned relation to each other, threading the ends of a U-shaped tail wire through the aligned perforations in the tabs on the plates, deforming the wire through the apertures in the plates to form projections on opposite sides of the wire in engagement with one side of some of the tabs, moving the wire longitudinally to move the projections thereon from engagement with one side of some of the tabs on the plates into engagement with the opposite side of other tabs, and again deforming the wire through the apertures in the plates to form lateral projections on the wire in engagement with said one side of the tabs.

Other objects and advantages of the invention will become apparent by reference to the following detailed description and the accompanying drawings illustrating a preferred embodiment thereof, in which:

Fig. 1 is a face view of the cable supporting device attached to a cable with parts broken away;

Fig. 2 is a side elevational view of Fig. 1;

Fig. 3 is a cross-sectional view taken on the line 3—3 of Fig. 2 showing the supporting device in end elevation;

Fig. 4 is an enlarged fragmentary view of the wedge plate showing the tail wire thereon in one position in an initial stage of assembly;

Fig. 5 is a fragmentary plan view similar to Fig. 4 showing the tail wire in a second position on said plate and in an intermediate stage of assembly;

Fig. 6 is a longitudinal vertical sectional view taken on the line 6—6 of Fig. 5 and showing the parts in final stage of assembly; and Figs. 7 and 8 are detailed cross-sectional views taken on the lines 7—7 and 8—8, respectively, of Fig. 6.

Referring to the drawings, the cable supporting device or multiple drop wire clamp 10 comprises a pair of clamping elements or shells 12 for gripping a cable 14 therebetween, a pair of wedge plates 16, and a U-shaped tail wire 18 attached to the wedge plates 16 for supporting the device 10 and the cable 14. The clamping shells 12 are made from sheet metal formed into U-shape as viewed from the end with the opposed walls thereof slotted to provide two sets of opposed parallel fingers 20 extending from the curved web portion 21, the width of the fingers 20 being less than the slots therebetween. The length of the fingers 20 at one end of the shells 12 is relatively short and the length of successive fingers is progressively greater. The end portion of each finger 20 is bent to form a hook 22. A pair of the shells 12 is adapted to be assembled around the cable 14 with the fingers 20 of the elements interfitting as shown in Figs. 1, 2, and 3 with the cable 14 encircled and gripped between the shells and with the hooks 22 of the elements disposed in rows in diverging relation to each other.

The shells 12 are maintained in gripping engagement with the cable 14 by the wedge plates 16, which have diverging side edges 25 engageable with the hooks 22 of the clamping elements for imparting lateral movement to the shells 12 in response to longitudinal movement of the wedge plates 16 relative to the shells. When the device 10 is supporting a portion of the cable 14 from a post or other support, the tail wire 18 and the wedge plates 16, are held against movement longitudinally of the tail wire while the cable 14 and the clamping shells 12 thereon are urged downwardly by their weight, tending to move the shells 12 longitudinally relative to the wedge plate and thereby cause the shells to be urged into tight clamping engagement with the cable.

Along the longitudinal centerline thereof, the wedge plates 16 are provided with three equally spaced apart tabs 28 punch formed from the plate and forming apertures 29 therein conforming to the outline of the tabs. Each of the tabs 28 is disposed at right angles to the face of the plate and has a perforation 30 punched therein of a size slightly larger than the diameter of the tail wire 18 and substantially tangent with the face of the wedge plates. An aperture 32 is punched in each of the wedge plates 16 along the centerline thereof and spaced from the adjacent aperture 29 a distance substantially equal to the distance between adjacent apertures 29.

In attaching the tail wire 18 to the wedge plates 16 the ends of the tail wire are threaded through the perforations in the tabs 28 in the plates and positioned with the end portion thereof disposed opposite the apertures 32 as shown in Fig. 4. The two wedge plates and the tail wire interfitting therewith are then placed in a tool or device of the kind disclosed in the co-pending patent application of Doering-Jones-Morison, Serial No. 396,874, filed December 8, 1953, and the end portions of the wire 18 which are aligned with the apertures 32, and the portions which are aligned with the two righthand apertures 29 of each wedge plate as viewed in Figs. 4–6, are deformed by punches engaging opposite sides of the wire to provide flattened portions 35 and 36, 36.

The flattened portion 35 has a flat lower face 38 disposed in the plane of a face of a wedge plate 16 and has lateral projections extending beyond the width of the tail wire 18 and forming lateral shoulders 39 thereon engageable with one of the tabs 28 in response to axial movement of the wire 18 relative to the wedge plate. The flattened portions 36 which are deformed equally from opposite sides of the wire towards a central plane therebetween have lateral diametrically opposed projections along the central portion of the wire with pairs of tab engaging shoulders 40 on opposite ends thereof. One pair of shoulders 40 on the flattened portions 36 are in engagement with one face of the tabs 28 when the portions 36 are formed in the wire as shown in dotted lines in Fig. 4. The lateral projections thus formed in this manner do not increase the length of the wire nor appreciably reduce the tensile strength thereof. After the flattened portions 35, 36, 36 are formed, the tail wire is moved longitudinally to the left as viewed in Fig. 4 a predetermined distance to move the shoulders on the flattened portions 36, 36, and 35 into engagement with the opposite sides of the tabs 28 in the path of movement thereof as viewed in Fig. 5. Opposite sides of the wire 18 adjacent the two righthand tabs 28 as viewed in Fig. 5 are then deformed to form a second pair of flattened portions 42 similar to the flattened portions 36, which portions 42 have laterally extending projections with shoulders 43 thereon in engagement with the tabs 28. The shoulders 39, 40 and 43 on the flattened portions 36, 42, and 35 disposed on opposite sides of the tabs 28 prevent longitudinal movement of the wire 18 relative to the plate 16 and the flattened portion 35 with the lower face 38 thereof in engagement with the upper face of the plate 16 prevents turning movement of the wire 18 relative to the plate 16.

Moreover, by flattening the wire from opposite sides toward a diameter thereof, the wire is not elongated and it is secured to the wedge plates 16 without appreciably reducing the tensile strength of the wire.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an article of manufacture the combination of a plate having a plurality of tabs extending from one face thereof in aligned and uniformly spaced relation one to another and spaced inwardly from the edges of the plate, said tabs having perforations therein substantially tangential to one face of the plate, and a wire extending through the perforations in said tabs in contact with said one face of the plate and having flat portions on opposite sides of the tabs in parallel relation to the plate, said flat portions being disposed parallel to the plate and having a thickness less than the diameter of the wire and a width greater than said diameter and provided with laterally extending shoulders in engagement with opposite sides of the tabs to prevent longitudinal movement of the wire relative to the plate and to establish a connection between the plate and the wire of high tensile strength.

2. A connection of high tensile strength of a wire to a plate comprising a plate having a plurality of tabs extending from one face thereof in aligned and uniformly spaced relation to one another and spaced inwardly from the edges of the plate, said tabs having perforations therein substantially tangential to one face of the plate, and a wire extending through the perforations in said tabs in engagement with said one face of the plate and having flat portions on opposite sides of the tabs in parallel relation to the plate, said flat portions being disposed parallel to the plate and having a thickness less than the diameter of the wire and a width greater than said diameter and provided with laterally extending shoulders in engagement with opposite sides of the tabs to prevent longitudinal movement of the wire relative to the plate, said wire having a flattened portion with a flat face tangent to the periphery of the wire and engaging said one face of the plate to prevent turning of the wire relative to said plate.

3. In an article of manufacture the combination of a plate having a plurality of tabs extending from one face thereof in aligned and uniformly spaced relation to each other and having a plurality of apertures therein formed by said tabs and having a hole therein in alignment with said apertures and spaced from the adjacent aperture a distance substantially equal to that between adjacent apertures, said tabs having perforations therein substantially tangent to one face of the plate, and a wire extending through the perforations in said tabs in engagement with said one face of the plate and having flat portions on opposite sides of the tabs, said flat portions being disposed parallel to the plate and having a thickness less than the diameter of the wire and a width greater than said diameter and provided with shoulders in engagement with opposite sides of the tabs to prevent longitudinal movement of the wire relative to the plate and to establish a connection between the wire and the plate having a high tensile strength substantially equal to that of the wire, said wire having a deformed end portion with a flat face tangent to the periphery of the wire and engaging said one face of the plate to prevent turning of the wire relative to the plate.

4. A method of attaching a wire to a plate which comprises punch forming a plurality of perforated tabs on said plate with the tabs disposed in a row and substantially perpendicular to the plate and with the tabs spaced apart uniform distances, inserting a wire through the perforations in the tabs, deforming portions of the wire adjacent one side of some of said tabs into engagement with said one side of said tabs, moving the wire longitudinally to move the deformed portions from engagement with one side of the tabs into engagement with the opposite sides of other tabs in their path of movement, and again deforming portions of the wire adjacent said one side of the tabs into engagement with said one side of the tabs.

5. A method of attaching a wire to a plate which comprises punch forming a plurality of perforated tabs on said plate with the tabs disposed in a row and substantially perpendicular to the plate and with the perforations therein substantially tangential to a face of the plate and with the tabs and the apertures in the plate formed by the tabs spaced apart uniform distances, inserting a wire through the perforations in the tabs, flattening portions of the wire on opposite sides thereof adjacent one side of some of said tabs and in alignment with the apertures in said plate to provide lateral projections thereon in engagement with said one side of said tabs, moving the wire longitudinally to move the flattened portions and lateral projections from engagement with said one side of the tabs into engagement with the opposite sides of other tabs in their path of movement to prevent longitudinal movement of the wire relative to the plate in one direction, and again flattening portions on opposite sides of the wire adjacent said one side of the tabs to form lateral projections engageable with said one side of the tabs to prevent longitudinal movement of the wire relative to the plate in the opposite direction.

6. A method of attaching a wire to a plate which comprises punch forming a plurality of perforated tabs on said plate with the tabs disposed in a row and substantially perpendicular to the plate and with the perforations in the tabs substantially tangential to a face of the plate and with the tabs and the apertures in the plate formed by the tabs spaced apart uniform distances, inserting a wire through the perforations in the tabs, flattening portions on opposite sides of the wire adjacent one side of some of said tabs and in alignment with the apertures in said plate to provide lateral projections thereon engaging said one side of said tabs, flattening a portion of the wire to form a flat face thereon engageable with said face of the plate, moving the wire longitudinally to move the flattened portions and lateral projections from engagement with said one side of the tabs into engagement with the opposite sides of other tabs in their path of movement to prevent longitudinal movement of the wire relative to the plate in one direction and to move said flat face into engagement with said face of the plate to prevent relative turning between said wire and the plate, and again flattening portions on opposite sides of the wire adjacent said one side of some of the tabs to form lateral projections engageable with said one side of the tabs to prevent longitudinal movement of the wire relative to the plate in the opposite direction.

7. A method of attaching a wire to a plate which comprises punch forming a plurality of perforated tabs on said plate with the tabs disposed in a row and substantially perpendicular to the plate and with the perforations therein substantially tangential to a face of the plate and with the tabs and the apertures in the plate formed by the tabs spaced apart uniform distances, inserting a wire through the perforations in the tabs, flattening portions on opposite sides of the wire adjacent one side of said tabs and in alignment with the apertures in said plate to provide lateral projections thereon engaging said one side of said tabs, flattening the end portion of the wire to form a flat face thereon engageable with said face of the plate, moving the wire longitudinally to move the flattened portions and lateral projections from engagement with said one side of the tabs into engagement with the opposite sides of other tabs in their path of movement to prevent longitudinal movement of the wire relative to the plate in one direction and to move said flat face into engagement with said face of the plate to prevent relative turning between said wire and the plate, and again engaging and flattening portions on opposite sides of the wire adjacent said one side of the tabs to form lateral projections engaging said one side of the tabs to prevent longitudinal movement of the wire relative to the plate in the opposite direction.

8. A method of attaching the ends of a U-shaped wire to a pair of wedge plates to form a component of a cable supporting device which comprises punch forming a plurality of perforated tabs on each of a pair of said plates with the tabs disposed in a row and substantially perpendicular to the plates and with the perforations therein substantially tangential to a face of the plates and with the tabs and the apertures in the plates formed by the tabs spaced apart uniform distances, punching a hole in each of said plates in alignment with the other apertures therein and spaced from the end one thereof a distance substantially equal to that between the tabs, inserting the ends of the U-shaped wire through the perforations in the tabs to a position in alignment with said holes in the plates, flattening portions of the wire from opposite sides thereof adjacent one side of some of said tabs and in alignment with the apertures in said plate to provide opposed lateral projections thereon engaging said one side of the tabs on said plates and simultaneously therewith flattening the ends of the wire between pairs of punches to form flat faces at the ends of the wire engageable with said faces of the plates, moving the wire longitudinally on the plates to move the flattened portions from engagement with one side of some of tabs into engagement with the opposite sides of other tabs in their path of movement to prevent longitudinal movement of the wire relative to the plates in one direction and to move said flat faces at the ends of the wire into engagement with said faces of the plates to prevent relative turning between said wire and the plate, and again flattening portions of the wire on opposite sides thereof adjacent said one side of the tabs to form lateral projections engaging said one side of the tabs to prevent longitudinal movement of the wire relative to the plate in the opposite direction.

9. A connection of a wire to a plate comprising a plate having a plurality of tabs extending perpendicularly thereto from one face thereof in aligned and uniformly spaced relation to each other and having apertures therein formed by said tabs, said tabs having perforations therein substantially tangent to said one face of the plate, and a straight wire extending through the perforations in said tabs in engagement with said face of the plate and having flat portions thereof on opposite sides of the tabs and disposed parallel to the plate and having laterally projecting shoulders in engagement with opposite sides of the tabs to prevent longitudinal movement of the wire relative to the plate and to establish a connecion between the wire and the plate having a high tensile strength substantially equal to that of the wire.

10. In an article of manufacture the combination of a plate having a plurality of tabs extending perpendicularly from one face thereof in aligned and uniformly spaced relation to each other and having apertures therein formed by said tabs, said tabs having perforations therein substantially tangent to said face of the plate, and a straight wire extending through the perforations in said tabs in engagement with said face and having flat portions thereof on opposite sides of the tabs disposed parallel to the plate and having laterally projecting shoulders in engagement with opposite sides of the tabs to prevent longitudinal movement of the wire relative to the plate and to establish a connection between the wire and the plate having a high tensile strength, said wire having a deformed portion with a flat face tangent to the wire and engaging said one face of the plate to prevent turning of the wire relative to the plate.

References Cited in the file of this patent

UNITED STATES PATENTS

| 194,541 | Stark | Aug. 28, 1877 |
| 1,158,078 | Sauer | Oct. 26, 1915 |
| 1,562,396 | Ward | Nov. 17, 1925 |
| 1,977,299 | Bates | Oct. 16, 1934 |
| 2,224,027 | Tate | Dec. 3, 1940 |
| 2,409,152 | Rundell | Oct. 8, 1946 |

FOREIGN PATENTS

| 768,536 | France | Aug. 7, 1932 |
| 690,464 | Germany | Apr. 26, 1940 |